Aug. 1, 1933.   H. S. BLACK   1,920,238
WAVE TRANSLATING SYSTEM
Filed April 3, 1931   6 Sheets-Sheet 1

INVENTOR
*H. S. BLACK*
BY *H. A. Burgess*
ATTORNEY

Aug. 1, 1933.  H. S. BLACK  1,920,238
WAVE TRANSLATING SYSTEM
Filed April 3, 1931  6 Sheets-Sheet 2

INVENTOR
H. S. BLACK
BY
*H. A. Burgess*
ATTORNEY

Aug. 1, 1933.  H. S. BLACK  1,920,238
WAVE TRANSLATING SYSTEM
Filed April 3, 1931   6 Sheets-Sheet 3

INVENTOR
H. S. BLACK
BY H. A. Burgess
ATTORNEY

INVENTOR
H.S. BLACK
BY
ATTORNEY

INVENTOR
H.S. BLACK
BY J.F.A. Burgess
ATTORNEY

Aug. 1, 1933.  H. S. BLACK  1,920,238
WAVE TRANSLATING SYSTEM
Filed April 3, 1931  6 Sheets-Sheet 6
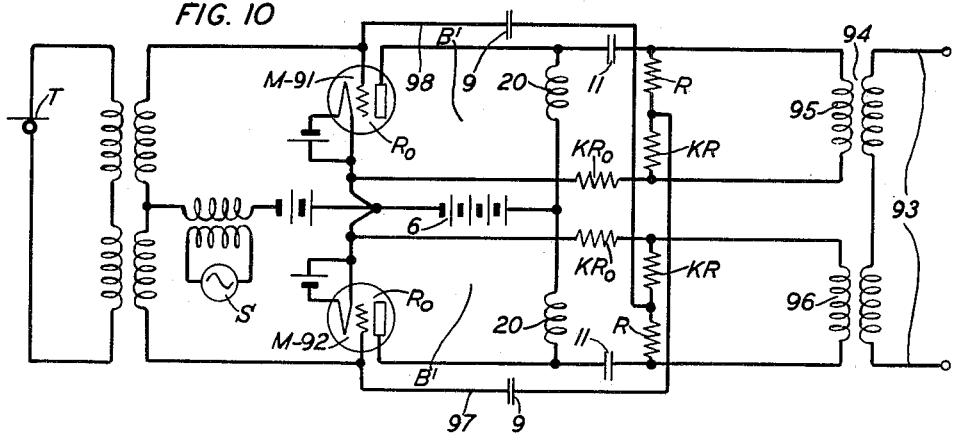
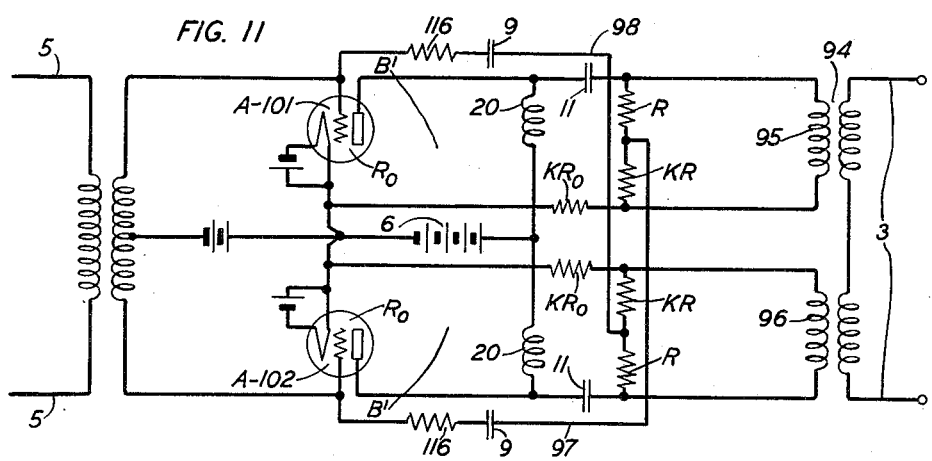
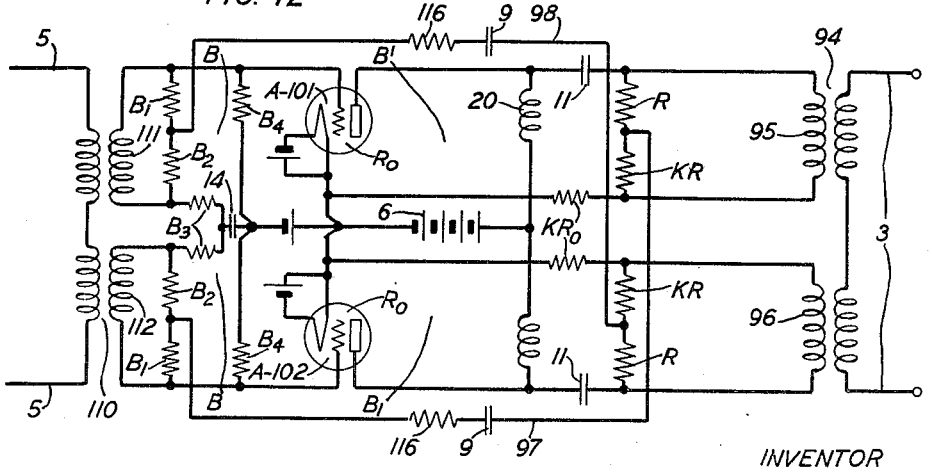
INVENTOR
H. S. BLACK
BY H. A. Burgess
ATTORNEY Patented Aug. 1, 1933

1,920,238

UNITED STATES PATENT OFFICE 1,920,238

WAVE TRANSLATING SYSTEM

Harold S. Black, Westfield, N. J., assignor to Bell Telephone Laboratories, Incorporated, New York, N. Y., a Corporation of New York Application April 3, 1931. Serial No. 527,371

20 Claims. (Cl. 179—171.)

This application is a continuation in part of my applications Serial No. 298,155, filed August 8, 1928, for Wave translation systems and Serial No. 439,205, filed March 26, 1930, for Wave translation systems.

This invention relates to wave translating methods and apparatus, as for example, modulators and amplifiers.

An object of the invention is to control distortion production in such apparatus.

It is also an object of the invention to facilitate suppression of fundamental waves, as for example, a carrier wave and a modulating signal wave, from the work circuit for a modulator.

It is also an object of the invention to obtain a favorable ratio of side band output power to carrier wave output power for a modulator.

Another object of the invention is to render the feed-back action and operation of a regenerative wave translating system, as, for example, a balanced regenerative vacuum tube amplifier or modulator, independent of the impedance of its load circuit and prevent the operation of the system from affecting the impedance with which it faces the load circuit.

It is also an object of the invention to render the input impedance of a wave translating circuit, as, for example, a balanced regenerative vacuum tube amplifier circuit, high and independent of frequency.

In one specific aspect the invention is a modulator in which the undistorted input waves (i. e. fundamental waves) that are to be combined in the modulator are so balanced against the output waves as to isolate the distortion waves produced in the modulator and cause the modulator to deliver to its work circuit modulation products to the exclusion of the input waves (i. e. to the exclusion of the fundamental waves which were combined in the modulator to produce the modulation products).

Regardless of whether the input waves comprise a complex wave, such a modulator does not necessarily require a plurality of modulating devices. Moreover, such a modulator circuit can transmit odd order modulation products to the work circuit while suppressing the fundamental waves whose combination in the modulator produces the odd order modulation products.

Since such a modulator gives no gain for fundamental waves, it is specially adapted to operate as a single translating device serving both as a modulator in transmitting and as a demodulator in receiving, for example, in a circuit of the general type shown in Espenschied Patents 1,502,811, July 29, 1924, and 1,556,319, October 6, 1925, Espenschied and Affel Patent 1,556,318, October 6, 1925, Affel Patent 1,554,188, September 22, 1925 and J. W. Horton Patent 1,581,576, April 20, 1926; for the suppression of the fundamental waves avoids their tendency to cause singing around each of the two loops formed by the modulator and its connections respectively to the low frequency signal transmission line and the high frequency (carrier wave) line between which it operates.

If desired the modulation products or distortion waves isolated from the fundamental waves are fed back to the input circuit to regenerate them for increasing the power output of modulation products delivered to the work circuit. For example, the isolated modulation products may be fed back a single time, and either in such phase as to augment the original products or in such phase and amplitude as to overpower or overbalance them; or the isolated modulation products may be so fed back as to be repeatedly regenerated in such phase as to increase their amplitude. If desired, the device in which the modulation is accomplished may be a vacuum tube device having two electrically separate coplanar grids, the fundamental waves to be combined being supplied to one of the grids and the isolated modulation products being fed to the other grid for regeneration in the device.

In another specific aspect the invention is a push-pull type of vacuum tube amplifier or modulator system of the general type of Colpitts Patent 1,128,292, February 16, 1915, or the modulator of Carson Patent 1,343,306, June 15, 1920, but with a Wheatstone bridge in each branch of the duplex output circuit of the system, each bridge having in one of its diagonals a connection to the load circuit and in the other diagonal a feed-back connection, so that the load circuit cannot react upon the feed-back connections and affect operation of the system and so the regenerative operation of the system cannot affect the impedance facing the load circuit. The feed-back connections are crossed from the output circuit of each tube to the input circuit of the other tube. This delivers waves to the input circuit of each tube in such phase that in the case of the modulator they cause the waves desired in the load circuit to be augmented or increased in the output circuit of the tube, and in the case of the amplifier they supply to the amplifier input impedance the current which would otherwise be supplied from the incoming line, in the general manner disclosed in C. W. Green Patent 1,668,240, May 1, 1928. As explained in that patent, thus supplying the current from the output side of the amplifier instead of from the incoming line, makes the input impedance of the tube circuit substantially infinite for a wide range of frequencies insofar as it affects the impressed waves, and its shunting effect thereon is greatly reduced, with important consequent economic advantages. If desired, Wheatstone bridges can be used in the tube input circuits, as well as in the tube output circuits, to prevent reaction between the incoming line and the feed-back connections in the general manner in which reaction is prevented between the outgoing or load circuit and the feed-back connections. In the case of the amplifier the prevention of these reactions widens the frequency range over which the input impedance can be maintained high.

Since the operation of demodulation is similar to that of modulation, references herein to modulation and modulators should be taken, where applicable, as generic to demodulation and demodulators.

Other objects and aspects of the invention will be apparent from the following description and claims.

In the drawings,

Figs. 10 to 12 show duplex wave translating circuits with crossed feed-back connections, from Wheatstone bridge networks at their output sides, for effecting desired regeneration in the circuits.

My Patent 1,686,792, October 9, 1928 and my application Serial No. 298,155, filed August 8, 1928, for Wave translation systems, show amplifiers of which modulator circuits of this invention are adaptations or modifications. In those amplifiers, distortion components unavoidably produced by passage of fundamental waves through a wave amplifying translating device are isolated from the fundamental waves by balancing substantially undistorted fundamental waves derived from the input side of the amplifier against distorted waves derived from the output side of the amplifier to neutralize the fundamental components of the opposed distorted waves and obtain the distortion components alone, and the isolated distortion components are made to balance out or neutralize the distortion components in the output circuit of the amplifier in order to obtain the amplified fundamental waves free from distortion.

Figure 1:
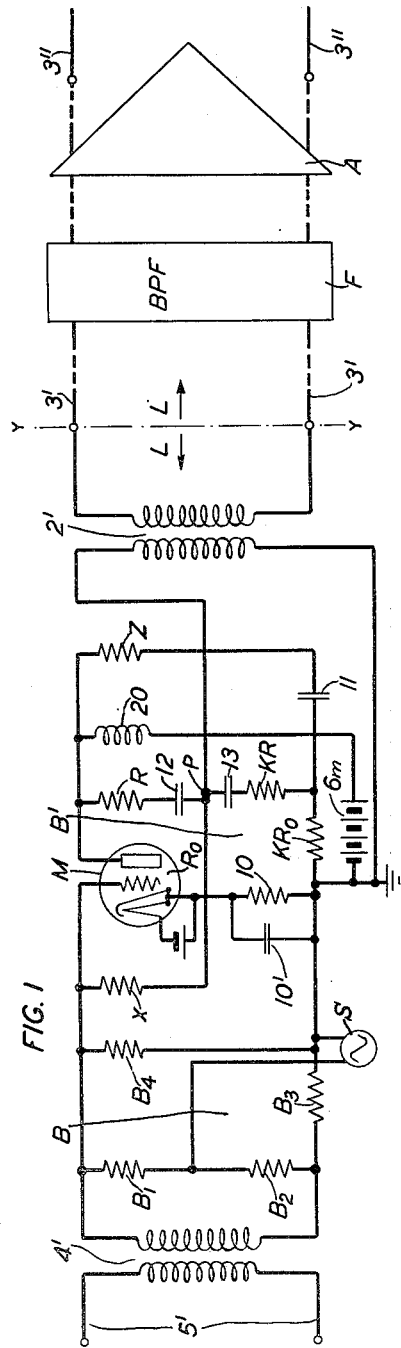
Fig. 1 shows a modulator circuit embodying one form of the invention.

Fig. 1 herein shows a modulator circuit in which a vacuum tube M is intentionally operated as a modulator or wave combining translating device for producing, in its output circuit, distortion of the fundamental waves impressed on the device. The fundamental waves may be, for example, an unmodulated carrier wave from a carrier wave source S, and an unmodulated speech or other signal wave from circuit 5' to modulate the carrier wave from source S in the device M. The distortion components intentionally produced in the output circuit of the device M by the combination of the fundamental waves in the device, are as in the case of the unavoidably produced distortion components in the amplifier circuits just mentioned, isolated from the fundamental waves by balancing undistorted fundamental waves derived from the input side of the translating device against distorted waves derived from the output side of the device to neutralize the fundamental component of the opposed distorted waves and obtain the distortion components alone with the fundamental components suppressed, and these isolated distortion components are transmitted to the load or work circuit 3'. A band pass filter F may be inserted in the load circuit to select a desired single side band to the exclusion of other waves, and the selected side band may be amplified in amplifier A and delivered to a line or circuit 3'', which may be, for example, a carrier line or a line to a radio transmitting antenna, for transmission to a distant point at which the side band may be demodulated in any suitable way, as, for instance, by a system such as that of Fig. 1 used as a demodulator to yield the signal, which may then be transmitted to a telephone receiver or other suitable receiving device. The receiving end of the signal transmission system is not shown since it may be considered to be substantially a duplicate of the transmitting end.

The circuit 5' is connected to the input side of the tube M through a transformer 4' and a Wheatstone bridge B. The four ratio arms of this input bridge comprise the four resistances $B_1$, $B_2$, $B_3$ and $B_4$, respectively. The circuit 5' is connected across the arms $B_1$ and $B_2$ in series and forms one diagonal of the bridge. The source S forms the other diagonal. The input circuit of the tube M is connected across arm $B_4$ of the bridge.

The output circuit of the tube M is connected through a Wheatstone bridge B' to a transformer 2' and thereby to the outgoing or load circuit 3', and is also connected through the output bridge B' and a stopping condenser 11 to an impedance Z which may be adjusted to any suitable value, as, for example, a value favorable to efficient operation of the tube M as a modulator. The stopping condenser may have negligibly low impedance for the fundamental waves from sources 5' and S. One ratio arm of the bridge is designated $R_o$ and is formed by the space discharge path resistance of tube M. A condenser 10', of negligibly low resistance for frequencies of the order of the frequencies of the fundamental waves, by-passes A. C. around resistance 10, which is connected in series with plate voltage supply source $6m$, choke coil 20 and the space path of tube M to furnish grid biasing potential for tube M from the voltage drop produced in resistance 10 by the steady direct current from source $6c$. The choke coil 20 has high choking impedance for currents of the frequencies of the fundamental waves from sources 5' and S. The impedance Z forms one diagonal of the bridge and the other diagonal comprises the transformer 2'. The four ratio arms of the bridge are designated by their impedance values $R_o$, $KR_o$, KR and R, where R may be a resistance and K a constant, or where R and K may be complex quantities or quantities of any suitable values and R and KR may be arranged in any way as ratio arms of the bridge as long as $$\frac{R}{KR} = \frac{R_o}{KR_o}$$

Condensers 12 and 13 are stopping condensers which may have negligibly low impedance for waves of the fundamental frequencies. There are no necessary restrictions on the value of Z. For example, its value may advantageously be zero in some cases. The value of K, R and Z may be selected to the best advantage for each use to which the circuit is to be put. The impedances in each direction from line Y—Y at the junction of line 3' and transformer 2' may be equal for the frequencies to be passed by F, as indicated by the impedance values L indicated at the arrows at line Y—Y. The impedance Z and the impedance of line 3', being in the diagonals of bridge B', are conjugate to each other. Consequently they do not react upon each other but are independent of each other and can be independently adjusted.

A resistance $x$ is connected between the grid of tube M and the point P, which is is the junction of the bridge arms R and KR. This resistance $x$ has such value that the fundamental voltage waves fed therethrough to point P from the grid of tube M just neutralize the fundamental voltage waves fed to the point P from the plate of the tube through the resistance R. Consequently the point P is a null point or point of zero potential (with respect to ground), as regards fundamental waves, and only distortion components are fed to the transformer 2' and work circuit 3'. Thus, by the resistance $x$, input waves, or carrier and modulating waves exclusive of other waves, are so balanced against output waves, or carrier waves plus modulating waves plus modulation products different from the carrier waves and the modulating waves, as to isolate those modulation products and cause them to be delivered to the work circuit 3' to the exclusion of the carrier waves and the modulating waves.

As shown in my application Serial No. 298,155 mentioned above, and in French Patent 680,681, January 22, 1930, the value of $x$ for balancing out fundamental waves to isolate the distortion components originating in the distorting device is $$x = \frac{R + R_o}{\mu},$$

where $\mu$ is the amplification constant of the tube M.

The tube M may be of any suitable type and is shown as a heater type with unipotential cathode heated indirectly from a heating filament. The modulator may be, for example, a plate current modulator operating on the general principle disclosed in Van der Bijl Patent 1,350,752, August 24, 1920.

The input bridge B prevents reaction between the sources 5' and S. However, if desired, the wave supplied from circuit 5' may include a carrier wave as well as a speech or other signal wave, the source S and elements B₁, B₂, B₃ and B₄ being omitted. When the system is used to demodulate, the waves supplied from circuit 5 may be, for example, one or both side bands of a speech modulated carrier wave, with or without the unmodulated carrier component. If the unmodulated carrier component is present in the waves supplied from circuit 5', that component need not be supplied from source S and source S and elements B₁, B₂, B₃ and B₄ can be omitted. When the system is used as a demodulator the filter F may be a low pass filter for passing the signal wave to the exclusion of higher frequencies.

By properly proportioning the system any feedback of distortion components from point P through $x$ to the grid of tube M, (which would be fed back in such phase as to cause these components to reappear in the plate circuit of the tube in phase opposite to their original phase), can be made unobjectionably small. Moreover, if desired such feed-back can be eliminated by feeding the fundamental waves from the input side of the distoring device to the point P through a distortionless unilaterally transmitting amplifier (with phase shift differing from that in the distorting device by 180° or an odd integral multiple thereof) instead of directly through $x$, in the fashion indicated in the application of S. T. Meyers, Serial No. 505,802, filed December 31, 1930, for Electric wave translating systems, assigned to the asignee of this application and in Fig. 9 described hereinafter. The use of such an amplifying path also facilitates obtaining large magnitude of side band output to circuit 3'.

Figure 2:
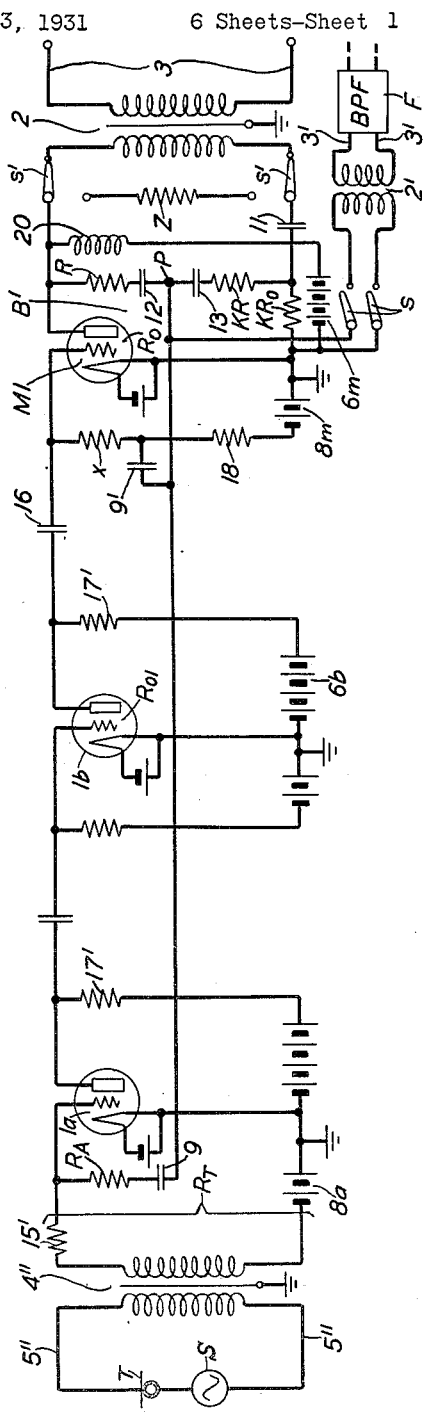
Fig. 2 shows a modulator circuit in which modulation products to the exclusion of fundamental components are fed back so as to be reamplified in the modulator circuit and return to their place of origin in phase opposite to their original phase.
Figure 4:
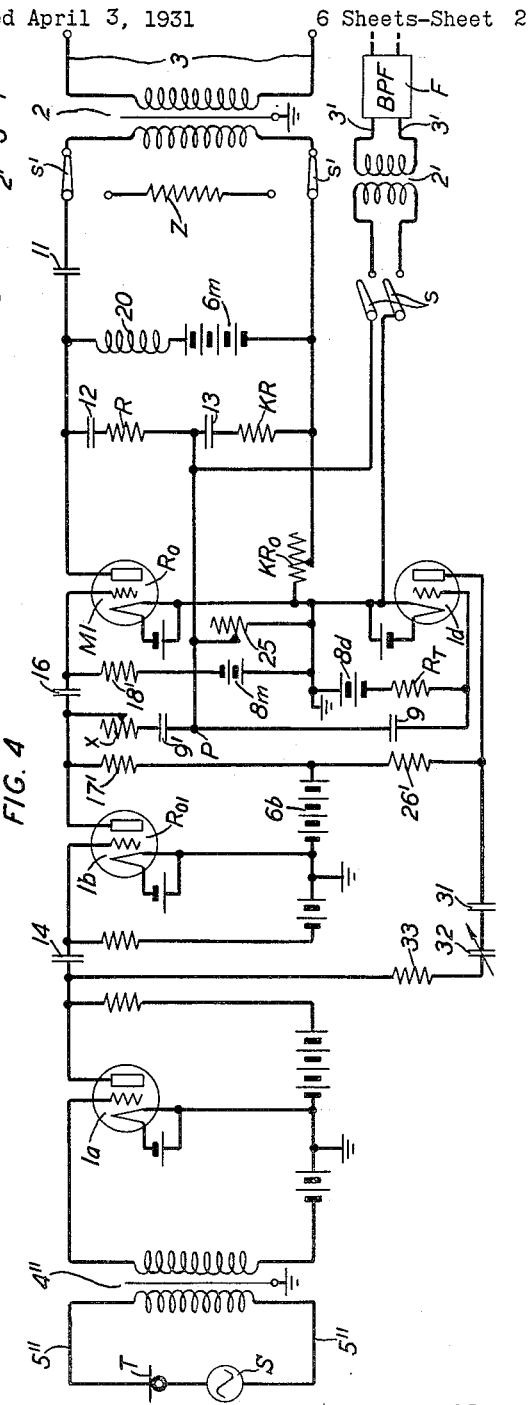
Fig. 4 is a modification of Fig. 2.

Fig. 2 shows a modulation circuit similar in configuration to the amplifier circuit of Fig. 4 in my application Serial No. 298,155 referred to above, and of Fig. 4 in the French patent mentioned above. The reference characters common to the three figures designate the same elements in the three figures. The system of Fig. 2 includes a wave combining or distorting device shown as a modulator tube M1 like tube M of Fig. 1 except with a filamentary cathode, and includes two vacuum tubes 1a and 1b for amplifying waves without distorting them substantially. As explained hereinafter, the modulator tube M1 also serves as a distortionless amplifier for distortion waves fed back to its input side.

The tubes 1a, 1b and M1 are resistance coupled in cascade connection. An incoming circuit 5'' supplies fundamental waves to be amplified without distorting them in tubes 1a and 1b and combined in tube M1. For example, the incoming waves may be modulating waves from a signal source conventionally represented as a telephone transmitter T and carrier waves from a carrier wave source conventionally represented as source S. Connected in series across the grid and filament of tube 1a, are a resistance 15' and the secondary winding of input transformer 4'' which connect the circuit 5'' with the tube 1a. The resistance 15' is sufficiently great to make the impedance of this resistance and the secondary-to-primary impedance of the transformer in series substantially a pure resistance $R_T$. By switches S, the tube M1 can be connected to load or work circuit 3' as in the case of the tube M of Fig. 1; and by switches S', impedance Z can be connected to form, as in the case of Fig. 1, a diagonal of the balanced Wheatstone bridge the ratio arms of which are $R_o$, $KR_o$, $KR$ and $R$. In the case of Fig. 2, the space discharge path of tube M1 constitutes $R_o$. In a feed-back diagonal of the bridge are a blocking condenser 9, a resistance $R_A$ and the resistance $R_T$ in series with each other and in parallel with a circuit comprising resistance $x$, stopping condenser 16, and the plate-to-filament space path resistance $R_{o1}$ of tube 1b in series. Preferably, the admittance of the space current supply path, through battery 6b and plate resistor 17′, which path is connected across R$_{o1}$, is negligibly small for frequencies of the order of the fundamental frequencies and the distortion components to be utilized. So also is the admittance of resistance 18 which is connected across the feed-back diagonal of the bridge. Biasing potential from battery 8m is applied to the grid of tube M1 through resistance 18 and x in series. Having this biasing potential applied through these two resistances instead of through merely resistance 18, increases the total impedance across the grid and filament of tube M1, across which the voltage from tube 1b is applied, to a value even higher than that of resistance 18. Blocking condenser 9 prevents grid biasing battery 8a from sending current through the primary winding of transformer 2′.

The system can be operated with switches S and S′ connecting circuit 3′ and impedance Z in circuit as in the system of Fig. 1; or it can be operated with switches S′ connecting a transformer 2 and work circuit 3 across R and KR in place of Z, with switches S either open or closed.

The system of Fig. 2 produces the null point P, i. e. isolates the distortion components produced in the distorting device from the fundamental waves applied to the device, in the manner described above for Fig. 1, but, by means of stopping condenser 9 and resistance R$_A$ connecting point P to the grid of tube 1a, feeds the isolated distortion components back through the tubes of the circuit in the general manner disclosed in the case of the amplifier circuit of Fig. 4 of my above mentioned application Serial No. 298,155 or the above mentioned French patent.

The waves so fed back reappear in the space discharge path of the distorting device in phase opposite to their original phase, but with amplitude greater, preferably much greater, than their original amplitude (instead of with amplitude equal to their original amplitude as in the case of the amplifier circuit just mentioned). This increase in their amplitude can be effected by tubes 1a, 1b, and M1. However, their amplitude at point P is not affected by the feed-back action, since the loss in the circuit from the grid of tube M1 through x to point P is the same as the loss in the circuit from that grid through that tube to point P. Thus the feed-back action does not affect the amplitude (nor the phase) of the distortion components delivered to circuit 3′. On the other hand with the distortion components fed back so as to reappear in the space discharge path of tube M1 in increased amplitude, and with the system suitably proportioned, the feed-back action can greatly increase the amplitude of the distortion components delivered to circuit 3 when that circuit is connected across R and KR. Moreover, this amplitude increase is not accomplished by increase in amplitude of the fundamental waves delivered to circuit 3; for there is no feed-back of fundamental waves. The amount of this amplitude increase for the distortion components depends upon the degree to which the distortion waves reappearing in the space discharge path of tube M1 overpower or overbalance the original distortion waves.

The impedance Z and the impedance of circuit 3 are conjugate to the feed-back diagonal of the bridge and therefore these impedances can not affect, nor be affected by, the feed-back action or operation of the system. Neither can they affect, nor be affected by the impedance of circuit 3′, since they are conjugate to it, also.

The circuit 3 may include, or transmit waves to, any suitable apparatus, such as the apparatus mentioned above by way of example as appropriate for inclusion in circuit 3′ or for receiving waves from circuit 3′. As in the case of Fig. 1, the receiving end of the signal transmission system is not shown since it may be considered to be substantially a duplicate of the transmitting end, as explained in connection with Fig. 1.

The system of Fig. 2 may operate as a demodulating system, as in the case of the system of Fig. 1, the circuit of transmitter T being replaced by a source of modulated carrier waves including one or both side bands of a signal with or without the unmodulated carrier component of the frequency of source S, or both sources S and T being replaced by a source of modulated waves including one or both side bands of a signal and the unmodulated carrier component.

Figure 3:
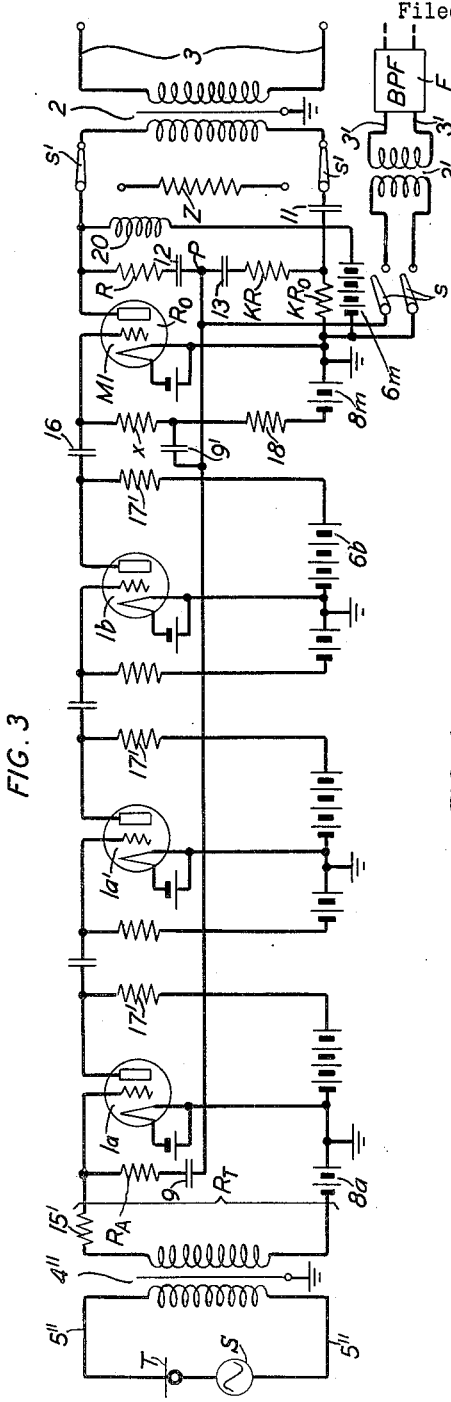
Fig. 3 is a modification of Fig. 2, in which the waves fed back return to their place of origin in their original phase.

The system of Fig. 3 is a modulator circuit which is the same as the system of Fig. 2, except that an additional amplifying stage comprising tube 1a′ has been inserted between tubes 1a and 1b. This additional tube is resistance coupled in cascade connection with the adjacent tubes 1a and 1b. It amplifies waves without distorting them. The additional stage causes the distortion waves fed back from point P to undergo an additional phase reversal. Consequently they reappear in the space discharge path of tube M1 with their phase differing from their original phase by an even integral multiple of 180°, so that the feed-back action of the circuit augments the magnitude of the distortion components delivered to circuit 3. The amount of the increase depends upon the degree to which waves are amplified in tubes 1a, 1a′ and 1b.

In Figs. 2 and 3 there should be an odd number of phase reversals in the portion of the regenerative path posterior to x; and in the remainder of the regenerative path, i. e. in the portion between R$_A$ and x, there should be an even number in Fig. 2 and an odd number in Fig. 3. As long as these conditions are satisfied, any suitable number of distortionless amplifying stages can be used in either portion. For example, if all of the required phase reversals are to be obtained in the tubes, in either Fig. 2 or Fig. 3 any even number of distortionless amplifying stages can be inserted in the portion of the circuit between x and the output bridge (in any positions relative to M1), and in Fig. 3 the number of distortionless amplifying stages between R$_A$ and x can be either diminished by two or increased by any even number, and in Fig. 2 the number of distortionless amplifying stages between R$_A$ and x can be increased by any even number, or can be diminished by two (i. e. made zero) if the fundamental waves be fed from the input side of the distorting device to the point P through a distortionless amplifier as in the Meyers application referred to above instead of directly through x. In Figs. 2 and 3, when tubes are inserted between x and the output bridge, in tandem with M1, if one or more of the tubes so inserted is posterior to M1 then Z would be omitted and the external plate circuit impedance of the modulating tube M1 would, in any usual way, be made of suitably low value for the fundamental waves, and of suitably high value for the distortion components to be utilized.

In Figs. 2 and 3, when the circuit includes a plurality of tubes in cascade connection between x and the output bridge, the value of $\mu$ used in the formula given above for $x$ is no longer the amplification constant of tube M1, but is the amplification of the circuit from a voltage on the grid attached to $x$ to the resulting driving voltage in the plate-to-filament space path that forms the arm $R_o$ of the output bridge. Of course, $R_o$ then no longer represents the space path resistance of tube M1.

In Figs. 2 and 3 the distortion waves produced by the passage through M1 of the fundamental waves from circuit 5'' will have to pass from the input side to the output side of tube M1, and should not be modulated in passing through tube M1. Their transmission level at the grid of tube M1 may be such as to insure that they will not suffer modulation to a substantial degree. For example, their level at the grid of tube M1 may be low compared to the level there of the fundamental wave from the circuit 5''. The functioning of the tube M1 to modulate and then amplify the modulation products fed back to its input side, may be, in general, as described for the modulator which amplifies the modulation products fed back to its input side in Carson Patent 1,343,306, June 15, 1920.

Fig. 4 shows a three-stage feed-back modulator system similar to that of Fig. 2, but modified in that instead of feeding the isolated distortion components (obtained across the feed-back diagonal of the Wheatstone bridge) back to the grid of the first stage or tube 1a and amplifying the distortion components and the fundamental components together in that tube before passing them on to the grid of tube 1b, those isolated distortion components are amplified separately from the fundamental waves, in a distortionless amplifier shown as comprising a single tube 1d (through which the fundamental components do not pass), and are then fed back to the grid of tube 1b. Thus, in the system of Fig. 4 the amplification of the isolated distortion components can be controlled independently of the amplification of the fundamental components, and can, for example, be made greater than the amplification of the fundamental components. The number of phase reversing amplifying stages (or other phase reversing means) in the path through which the distortion components are passed in their transmission from the feed-back diagonal of the bridge to the grid of tube M1 should be even. Thus, in this path, the number of phase reversing means or stages (such for example as that comprising tube 1b) in which the fundamental components and the distortion components are amplified alike should be odd or even according to whether an odd or an even number of phase reversing means or stages (such as that comprising the tube 1d) are used in which the fundamental waves are not amplified as the distortion components are.

In Fig. 4 the space current for tube M1 is supplied from battery 6m through a choke coil 20 of negligibly low admittance for the frequencies of the waves to be amplified, the current returning to battery 6m through resistance $KR_o$. Condensers 11, 12, 13 and 14, as well as condensers 9, 9' and 16, are stopping or blocking condensers which may have negligibly low reactance at the frequencies of the fundamental waves and the distortion waves to be used. If desired, the resistance $KR_o$ may be adjustable, as shown, to facilitate balancing the Wheatstone bridge, the ratio arms of which are formed by the plate-to-filament space path resistance $R_o$ of tube M1 and resistances $KR_o$, $KR$ and $R$. The adjustment of $KR_o$ can be made to correct unbalance resulting from variations in plate impedance of tube M1 caused for example by variations in the power supply voltages for the tube or by substitution of one tube for another. The impedance of the feed-back diagonal of the bridge can be adjusted by a variable resistance 25 connected in parallel with a path comprising condenser 9', resistance $x$ (shown adjustable), and plate-to-filament space path resistance $R_{o1}$ of tube 1b in series. Also in parallel with the resistance 25 is a path, of negligibly low admittance at the frequencies of the waves to be amplified, extending through stopping condenser 9, input or coupling resistance $R_T$ for tube 1d, and grid biasing battery 8d for that tube, in series. In parallel with $R_{o1}$ is a path through plate resistor 17' and battery 6b in series, and also a path through grid biasing battery 8m and input or coupling resistance 18' for tube M1. The two latter paths are of negligibly low admittance at the frequencies of the fundamental waves and the distortion components to be utilized. The resistance $R_T$ in Fig. 4 corresponds to the resistance $R_T$ in Fig. 2. In Fig. 4 there is no resistance corresponding to the resistance $R_A$ in Fig. 2; or in other words the resistance $R_A$ is zero for Fig. 4. The battery 6b supplies space current for tube 1d through plate resistor 26'. Tube 1d feeds back to the grid of tube 1b through condensers 31 and 32 and resistance 33 in series. This resistance adjusts the voltage thus fed to that grid; and these condensers adjust the phase of that voltage, the capacity of condenser 32 being variable and relatively large compared to that of condenser 31 to faclitate close or fine adjustment of the phase. The operation of the system of Fig. 4 will be apparent without further description, in view of the relationship pointed out above of Fig. 4 to Fig. 2 as regards the structure and operation of the systems of the two figures. Fig. 4 is related to the amplifier circuit of Fig. 5 of my above mentioned application Serial No. 298,155, as Fig. 2 is related to Fig. 4 of that application; and reference characters common to Fig. 5 of that application and Fig. 4 herein designate the same elements in the two figures.

Figure 5:
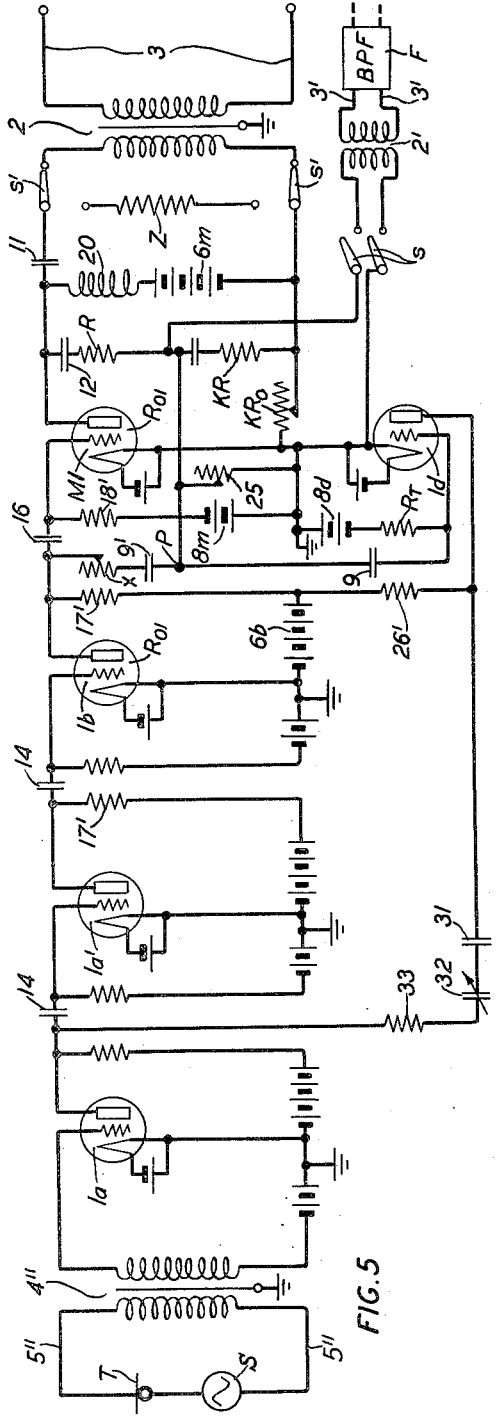
Figs. 5 and 6 are modifications of Fig. 3.

In this application, Fig. 5 bears the same relation to Fig. 4 that Fig. 3 bears to Fig. 2. In other words, the system of Fig. 5 is a modulator circuit which is the same as the modulator circuit of Fig. 4 except that an additional amplifying stage comprising tube 1a' has been inserted between tubes 1a and 1b. As in the case of Fig. 3, this additional stage amplifies waves without distorting them, and causes the distortion waves fed back from point P to undergo an additional phase reversal so that the feed-back action of the circuit augments the magnitude of the distortion components delivered to circuit 3.

Figure 6:
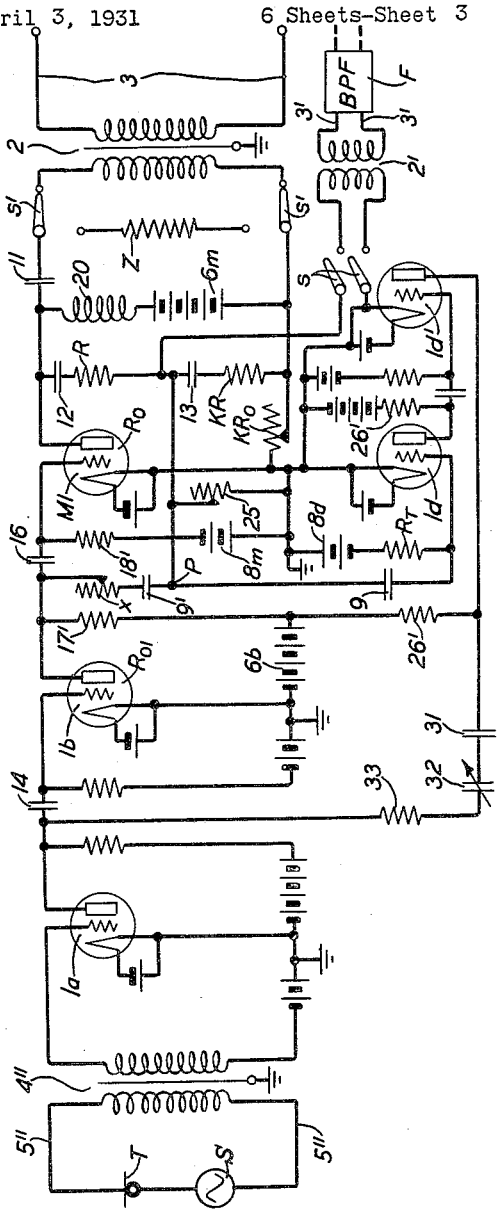

Fig. 6 is a modulator circuit likewise distinguished from Fig. 4 by such an additional stage, but in Fig. 6 the additional stage is designated 1d' and is inserted between tubes 1d and 1b, instead of between tubes 1a and 1b as in Fig. 5. Thus, the additional stage is in the auxiliary amplifier which amplifies only distortion waves instead of in the main amplifier which amplifies fundamental components as well as distortion components. As in the case of Fig. 5, the additional stage amplifies waves without distorting them substantially, and causes the distortion waves fed back from point P to undergo an additional phase reversal so that the feed-back action of the circuit augments the magnitude of the distortion components delivered to circuit 3.

Figures 7, 8:
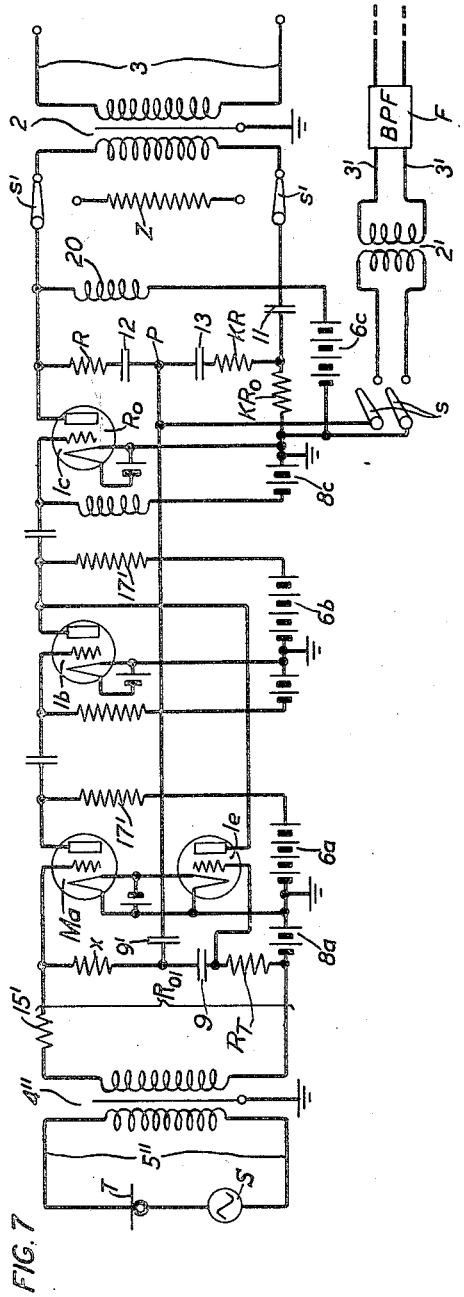
Fig. 7 shows a modulator circuit in which modulation products to the exclusion of fundamental waves are fed back in the modulator circuit so as to be repeatedly regenerated through a portion of the circuit.
Figs. 8 and 9 show modulator circuits which are modifications of the circuit of Fig. 7.

Fig. 7 shows a feed-back modulator somewhat related to the modulators of Figs. 2 to 6 and also to the modulator of Fig. 1, yet having important differences from those modulators as regards operation. The system of Fig. 7 comprises the tubes Ma, 1b and 1c connected in tandem, and an auxiliary tube 1e for amplifying only distortion waves, as described hereinafter. The tube Ma is a distorting or modulating tube, for combining waves to produce distortion products. The tubes 1b, 1c and 1e amplify waves without substantially distoring them. Connected in series across the grid and filament of tube Ma are a resistance 15' and the secondary winding of input transformer 4" which connects circuit 5" with the amplifier. The resistance 15' is sufficiently great to make the impedance of this resistance and the secondary-to-primary impedance of the transformer in series substantially pure resistance $R_{o1}$. The tube 1c is connected to the impedance Z and to lines 3 and 3' as in the case of the tube M1 of Figs. 2 to 6. As in those five figures, either the impedance Z or the work circuit 3 forms one diagonal of the balanced Wheatstone bridge the ratio arms of which are $R_o$, $KR_o$, $KR$ and $R$. In the other diagonal, i. e. the input diagonal of the bridge, is a path comprising blocking condenser 9', resistance $x$ and resistance $R_{o1}$ in series, resistance $x$ producing null point P of zero potential for fundamental waves as in Figs. 1 to 6. In parallel with this path is a path of negligibly low admittance to waves of the fundamental frequencies and the distortion waves to be utilized, which comprises blocking condenser 9, input or coupling resistance $R_T$ for tube 1e and grid biasing battery 8a in series. Battery 8a supplies grid biasing potential for tube 1e as well as for tube Ma. Battery 6b supplies plate potential for tube 1e as well as for tube 1b. The resistance $R_T$ in Fig. 7 corresponds to the resistance $R_T$ in Figs. 2 to 6, and receives only distortion voltage, from point P. In Fig. 7, as in Figs. 4 to 6, there is no resistance corresponding to the resistance $R_A$ in Figs. 2 and 3; or in other words the resistance $R_A$ is zero for Fig. 7. Tube 1e feeds, in parallel with tube 1b, into the grid or input circuit of tube 1c.

As in the case of the resistance $x$ in Figs. 2 to 6, the resistance $x$ in Fig. 7 is given such a value that the contribution of any voltage acting in series with $R_{o1}$ to the voltage across the input diagonal of the output bridge is zero, so that the voltage across $R_T$ is dependent solely on the distortion voltage in the plate-to-filament space path of tube 1c. That is, $$x = \frac{R+R_o}{\mu},$$

where $\mu$ represents the amplification from a voltage across the grid of the auxiliary tube 1e to a driving voltage in the plate-to-filament space path of tube 1c. Thus, as indicated above and as explained in connection with Figs. 2 to 6, the value of $x$ is such that the fundamental or original transmitted wave components have zero voltage across the feed-back diagonal of the bridge, i. e. across the grid and filament of tube 1e. Thus, theoretically at least, the auxiliary tube 1e, as in case of the auxiliary tube 1d in Figs. 4, 5 and 6, amplifies only distortion waves and no fundamental or original transmitted wave components.

Distortion waves are regenerated to increase their magnitude, in a manner analogous to that in which they are regenerated to increase their magnitude in Figs. 3, 5 and 6, through tubes 1e and 1c. However, they are regenerated repeatedly. The amount of the increase depends on $\mu$ and $\beta$ where $\mu$ represents the voltage amplification, and $\beta_2$ the voltage diminution, around the circuit through tubes 1e and 1c or through the path comprising the regeneration circuit for distortion waves. The number of phase reversing means, as for example, amplifying stages, in this path should be even, or at least the phase shift around the path should not be such that the regeneration will cause decrease of the magnitude of the distortion waves; but the number of amplifying stages in this path may be as great as desired, so the increase of the magnitude of the distortion waves can be as great as is necessary. Moreover, as long as the number of phase reversing means in this path is maintained even or such as to give a gain for the distortion components by regeneration, the auxiliary amplifier represented by stage 1e may have any desired number of stages, the number of stages used in this path which amplify fundamental waves being then made any desired number which will make the total number of phase reversing means in this path even or at least such as to give the desired increase in magnitude of distortion waves. For example, tube 1e may be replaced by three tubes in tandem.

In Figs. 2 to 6, neither distortion components nor fundamental components are repeatedly regenerated (except to an immaterial degree, in the last tube). However, the distortion components are fed back around a portion of the circuit once.

In Fig. 7 the distortion components are repeatedly regenerated, and the fundamental or original transmitted wave components are not fed back or regenerated. The circuit can be proportioned so that any regeneration of the distortion components through the path comprising the tubes Ma, 1b and 1c is negligibly small.

In Fig. 7, the path or loop circuit for regenerating the distortion components does not include any modulating tube, but includes only tubes which operate only to amplify waves without distorting them.

The circuit configuration of the modulating system of Fig. 7 is similar to that of the amplifying system of Fig. 6 of my above mentioned application Serial No. 298,155 (and of Fig. 6 of the above mentioned French patent), except that the work circuit 3' has been added and the plate of tube 1e has been connected to feed distortion waves to the grid of tube 1c instead of to the grid of tube 1b. The reference characters common to these figures designate the same elements in the different figures.

Fig. 8 shows a modulator circuit in which distortion waves are produced in a modulating and amplifying tube MA, and are isolated and regenerated in a manner similar to that described for the circuit of Fig. 7, but tubes 1b and 1c are omitted and for amplifying the isolated distortion waves an auxiliary control grid or space discharge control electrode 41' in modulating and amplifying tube MA is employed, instead of tubes 1b and 1c, the isolated distortion waves obtained across $x$ and $R_{o1}$ in series (i. e. across the input diagonal of the Wheatstone bridge) being amplified without distortion in tube 1e and then impressed on grid 41' and amplified without distortion in tube MA. Thus the distortion waves are repeatedly regenerated in tubes 1e and MA for increasing their magnitude. The distortion waves are generated in tube MA by the combination in that tube of fundamental waves applied to its grid 40' from circuit 5'', and these distortion waves are isolated from the fundamental waves by adjusting the value of $x$ as explained above so that across the path through $x$ and $R_{o1}$ in series the voltage of the fundamental or original transmitted wave components is zero or in other words, so that P is a null point or point of zero potential for fundamental waves. The tube MA may be, for example, an electric space discharge tube having coplanar grids. For instance, it may be a coplanar grid tube of the type disclosed by H. A. Pidgeon and J. O. McNally in their copending application, Serial No. 368,647, filed June 5, 1929 or in the Proceedings of the Institute of Radio Engineers, vol. 18, pages 266 to 293, February, 1930. Such a tube has two grids, each active elementary area on either grid being close to a corresponding active area on the other grid and being at substantially the same location as that corresponding area with respect to the cathode and the anode or plate. By way of example, each grid may have its lateral wires lie in the same plane or cylindrical surface as the lateral wires of the other grid and alternate with them. The grid 40' of tube MA is a control grid, to which the fundamental waves from circuit 5'' are applied. It is maintained always at negative potential by biasing potential from battery 8''. Grid 41' is also a control grid, since the distortion waves to be regenerated in tubes 1e and MA are applied to it for amplification in tube MA. Grid 41' is maintained always positive by a biasing battery 8 which supplies positive biasing potential to this grid through a choke coil 42 which has negligibly low admittance for waves of the frequencies to be amplified.

The two grids function alike as far as their action upon the plate circuit is concerned, and at the same time are independent and function independently of one another.

Figure 9:
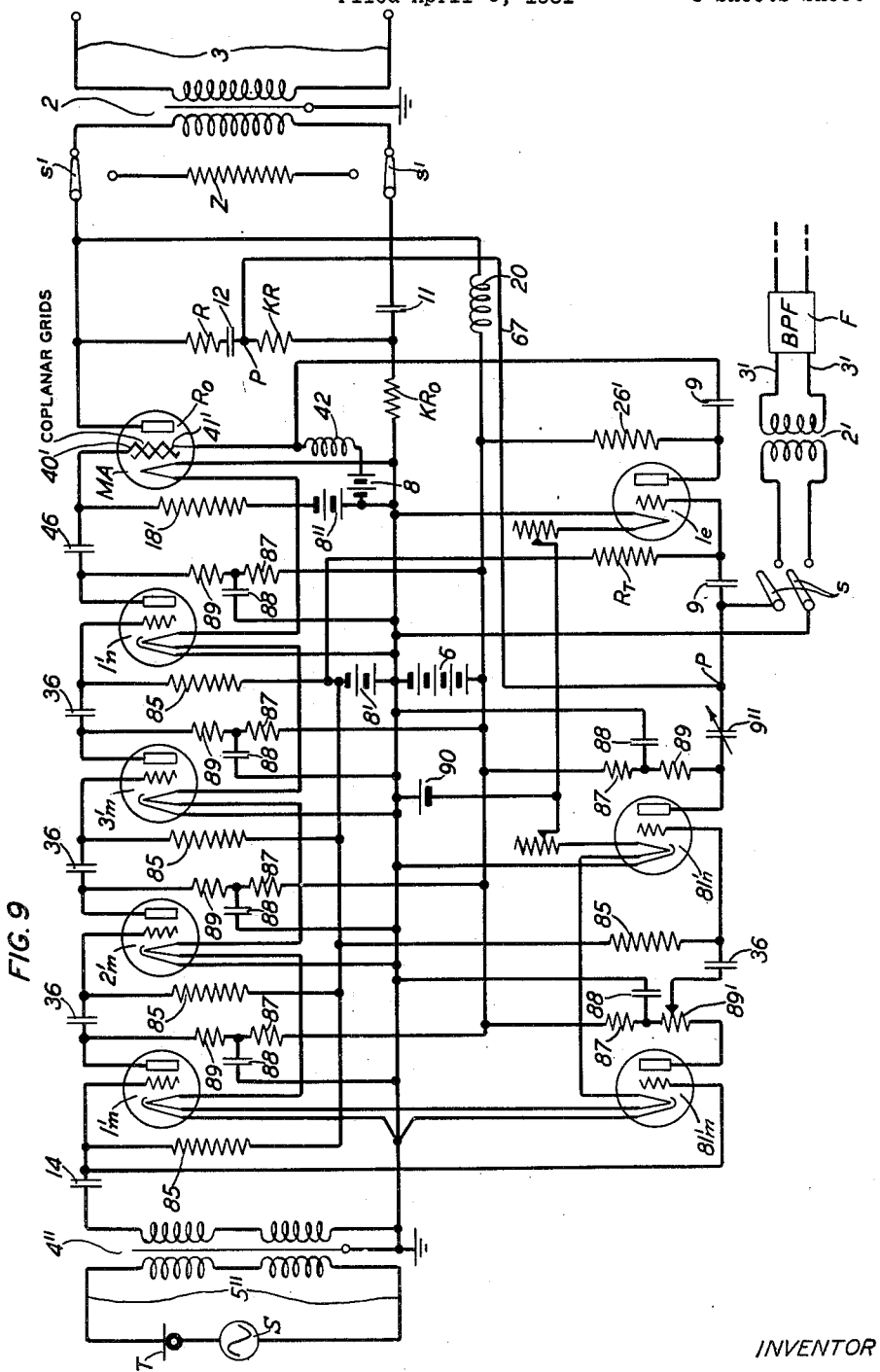

The modulator circuit of Fig. 8 is a modification of the amplifier circuit of Fig. 9 of my above mentioned application Serial No. 298,155, and of Fig. 9 of the above mentioned French patent.

Fig. 9 herein shows a modulator system which is a modification of that of Fig. 8 principally in that Fig. 9 employs instead of the resistance $x$, an amplifier, auxiliary to the modulating tube, for producing the null point P. This auxiliary amplifier comprises two tubes 81'm and 81'n, connected in cascade relation for amplifying waves without distorting them substantially. Tubes 1'm, 2'm, 3'm and 1'n, in cascade connection, for amplifying waves from circuit 5'' and delivering them to tube MA substantially undistorted, are shown in Fig. 9. However, these four tubes can be omitted, if desired, the junction of resistance 85 and stopping condenser 14 being then connected directly to the left hand side of stopping condenser 46 in the figure. The modulator system of this figure is an adaptation of the amplifier circuit of Fig. 4 of the S. T. Meyers application mentioned above, and reference characters common to the two figures designate the same elements in the two figures.

All of the tubes, except the tube 1e and the coplanar grid tube MA, are shown as heater type tubes (for example Western Electric Company type 247—A tubes). The filament current for all of the tubes is supplied from a voltage source shown as a filament heating battery 90.

As in the case of Fig. 8 battery 6 supplies space current for tube MA through a choke coil 20; the tube MA has its grid 40' maintained at negative potential by grid battery 8'', through resistance 18', this grid 40' being the grid to which are applied the fundamental waves that are to be combined in tube MA; and tube MA has its grid 41' maintained at positive potential by grid battery 8 through choke coil 42.

All of the tubes except MA and 1e have grid lead resistors 85 connected to grid battery 8', one of the resistors 85 being common to tubes 1'm and 81'm. Plate battery 6 supplies space current for tubes 1'm, 2'm, 3'm, 1'n, 81'm and 81'n through resistance-capacity filters which are individual to the tubes and each of which comprises a resistor 87 and a condenser 88 in addition to a plate resistor 89 or 89' for its tube. The plate resistor for tube 81'm, instead of being a simple resistance such as the resistors 89, is a potentiometer resistance for varying the gain of the auxiliary amplifier comprising tubes 81'm and 81'n. Condensers 36 and 46 are stopping condensers such as 9, 11, 12 and 14.

The tube MA functions as a modulator and also as an amplifier, as in Fig. 8.

The null point P, or point of zero potential for fundamental waves, is produced in general as in the preceding figures, by feeding to the grid leak resistance $R_T$ of tube 1e (i. e., to the grid of tube 1e or the point P), two signals or fundamental waves of equal amplitude but opposite phase, one from the bridge in the output circuit of tube MA, through conductor 67, and the other from the grid of tube 1'm, through the auxiliary amplifier comprising tubes 81'm and 81'n and a variable phase adjusting condenser 9''.

As in Fig. 8, only distortion waves resulting from the modution in the modulator (and amplifier) tube MA appear at point P, and no fundamental waves. This is because potentiometer 89' is so adjusted to give amplitude equality or balance between the fundamental waves fed to point P through conductor 67 and the fundament waves fed to point P through the auxiliary amplifier comprising tubes 81'm and 81'n, and because the phase shift in the circuit from the grid of tube 1'm through tubes 1'm, 2'm, 3'm, 1'n and MA to point P differs by 180° or an odd multiple thereof from the phase shift in the circuit from the grid of tube 1'm through tubes 81'm, 81'n and condenser 9'' to point P.

As in Fig. 8 tube 1e amplifies the distortion components appearing at point P without distorting them, and feeds them to the grid 41' of tube MA for amplifying them in tube MA without modulating or distorting them, and thus they are repeatedly regenerated through tubes 1e and MA acting in tandem, to increase the magnitude in which they are delivered to circuits 3 and 3'. The total phase shift in this regeneration path, obtained, for example, by the phase shifts in the tubes, should be such as to cause the desired increase in the amplitude of the regenerated distortion components, and may, if desired, be an even multiple of 180° as in the case of the circuit shown in the figure. Thus, if desired, the tube 1e can be replaced by three tubes in cascade connection, for example.

Any desired number of tubes may be used in place of the set of tubes 1'm, 2'm, 3'm and 1'n and the set of tubes 81'm and 81'n, provided the phase shift through the paths of the two sets to point P be an odd multiple of 180° as indicated above.

Fig. 10 shows a push-pull, regenerative modulator circuit which not only suppresses the carrier wave from the outgoing or work circuit by balance, but repeatedly regenerates all applied fundamental waves and all of the distortion waves resulting from modulation in the circuit, so as to increase the magnitude of the distortion waves and increase the ratio of side band to carrier leak.

This circuit is of the general type of carrier suppression push-pull, duplex modulator disclosed in the Carson Patent 1,343,306, mentioned above or in Carson Patent 1,449,382, March 27, 1923, and includes modulating elements shown as electric space discharge modulator tubes M—91 and M—92, a source T of speech or other signal or modulating waves conventionally shown as a telephone transmitter, a source S of carrier waves to be modulated by the waves from source T in tubes M—91 and M—92, and an outgoing or work circuit 93. The carrier source impresses waves on the grids of the two tubes in the same phase. The source T impresses waves on the grids of the two tubes in opposite phase. Output transformer 94 is wound or connected to suppress carrier waves from transmission to circuit 93 but to transmit (even order) side band components from the two tubes cumulatively (i. e., in the same phase) to circuit 93.

In accordance with the present invention, each tube in the system of Fig. 10 has in its output circuit a Wheatstone bridge B' with ratio arms $R_o$, $KR_o$, $KR$ and $R$ as in the case of the output bridges, described for the preceding figures. Transformer 94 has two primary windings 95 and 96, one of which is connected across arms $R$ and $KR$ of one of the bridges and the other of which is connected across the arms $R$ and $KR$ of the other bridge, so that windings 95 and 96 form the output diagonals of the bridges, respectively.

Crossed feed-back connections 97 and 98 are provided for the two tubes, for feeding waves back from the output circuit of each tube to the grid of the other tube in such phase that of the waves so fed back to each grid the fundamental signal and carrier components are respectively in phase with and in phase opposition to the fundamental signal and carrier waves originally applied to the grid from sources T and S and the distortion waves are in such phase as to appear in the plate circuit in phase with the distortion waves originally generated there. Thus, the feed-back action or regeneration in the circuit increases the amplitude of the distortion waves and of the fundamental signal waves in the windings 95 and 96, and tends to decrease the amplitude of the unmodulated carrier component in those windings. The regeneration of the unmodulated carrier component reduces its amplitude on the grids, but this effect can be compensated to any desired extent by increasing the voltage applied from source S. The feed-back action or regeneration in the circuit increases the amplitude of the even order distortion components or side band components in the outgoing or work circuit 93, and increases the ratio of this amplitude to the amplitude of the unmodulated carrier component in the work circuit, i. e. to the carrier leak. As in the case of the outgoing circuits of the preceding figures, this circuit 93 may include frequency selective means for selecting a single side band, or any such apparatus as is mentioned above as suitable for connection in or to those circuits.

Condensers 9 and 11 are stopping condensers of negligibly low impedance as described in connection with preceding figures.

The feed-back connections 97 and 98 are in diagonals of the bridges B' which are conjugate to the windings 95 and 96, respectively. Consequently neither the load circuit impedance nor the impedances presented by windings 95 and 96 can affect, or be affected by, the feed-back action or operation of the system.

The modulator circuits of Figs. 3 to 10 can be used as demodulator circuits, as in the case of Figs. 1 and 2. In Figs. 3 to 10, as in the case of Figs. 1 and 2, the outgoing circuits may transmit to distant points at which the modulated waves may be demodulated in any suitable way, as for instance in a demodulator circuit such as the modulator circuit shown for the transmitting end of the signal transmission system, to yield the signal which may then be transmitted to a telephone receiver or other suitable receiving device. In the case of Figs. 3 to 10, as in the case of Figs. 1 and 2, the receiving end of the signal transmission system is not shown, since it may be, for example, substantially a duplicate of the transmitting end.

Fig. 11 shows a push-pull, regenerative amplifier circuit in which this same conjugacy is present. This circuit is for amplifying waves from circuit 5 without substantially distorting them. The amplified waves are transmitted to an outgoing or work circuit 3. The waves from circuit 5 may be, for example, voice waves to be amplified, or voice modulated carrier waves to be amplified and transmitted over multiplex carrier wave wire transmission systems or to radio transmitting antennae or waves received over such systems. The circuit configuration is like that of Fig. 10 except that the carrier source S is omitted and the circuit 5 replaces the source T, and feed-back or neutralizing impedances 116 corresponding to those at 16 in C. W. Green Patent 1,668,240, referred to above, are included in the feed-back connections 97 and 98. The condensers 9 and 11 are stopping condensers of negligibly low impedance, as in preceding figures.

The feed-back connections in Fig. 11 are for supplying to the amplifier input impedance the current which would otherwise be supplied from circuit 5, in the general manner disclosed in the C. W. Green patent just mentioned. As explained in that patent, thus supplying this current from the output side of the amplifier instead of from the incoming line, makes the input impedance of the tube circuit substantially infinite for a wide range of frequencies insofar as it affects the impressed waves, and its shunting effect thereon is greatly reduced, with important consequent economic advantages. The form of the impedances 116 is not restricted, and their form and magnitude can be determined in accordance with the principles set forth in that patent for determining the impedances 16 in that patent.

In accordance with this invention, the compensation for the input impedance is facilitated and the degree to which the compensation is effected and the frequency range over which it is effected are increased by the conjugacy referred to above between the feed-back connections and the windings 95 and 96; for this conjugacy prevents the phase angle of the load impedance from affecting the phase of the feed-back voltage, and from thereby interfering with proper compensation as explained in the C. W. Green patent mentioned above.

Fig. 12 is an amplifier circuit which is the same as Fig. 11 except that a Wheatstone bridge has been included in the input circuit of each tube as well as in the output circuit of the tube, so that the incoming circuit 5 and secondary windings 111 and 112 of input transformer 112 are conjugate to the feed-back connections 97 and 98. This conjugacy facilitates the compensating for the input impedance of the amplifier, since the conjugacy prevents the phase angle of the circuit 5 and the phase angles of the secondary-to-primary impedances of transformer 110 from affecting the phase of the voltages fed back to the grids of the tubes. The input bridges are designated B and have ratio arms $B_1$, $B_2$, $B_3$ and $B_4$ as described above in connection with Fig. 1. The condensers 9, 11 and 14 are stopping condensers of negligibly low impedance, as described in connection with the preceding figures.

If desired, this conjugacy can be obtained in the circuit of Fig. 10, also. That is, Wheatstone bridges B can be included in the input circuits of the tubes in Fig. 10 as in the case of Fig. 12. This feature is especially advantageous in a circuit such as that of Fig. 10, for facilitating insertion of a frequency selective network in the feed-back connections, to feed back only the wave components that it is desired to regenerate or increase by regeneration. For example, such a network may be a simple series condenser or a filter type network for discriminating against transmission of waves of the speech or signal frequencies in favor of waves of the frequencies of the side band or side bands desired in circuit 93.

What is claimed is:

1. The method of modulation which comprises so combining fundamental waves, including waves to be modulated and modulating waves, as to produce a resulting wave containing fundamental components having the same frequencies as said fundamental waves and modulation products having frequencies differing from said fundamental components, isolating said modulation products from said fundamental components by balancing said fundamental waves exclusive of modulation products against said resulting wave in such phase and amplitude relative to said fundamental components as to neutralize said fundamental components in said resulting wave, and utilizing certain of said modulation products.

2. The method which comprises modulating a fundamental carrier wave with a fundamental modulating wave to produce a resulting wave containing fundamental components having the frequencies of said fundamental waves and other components, adding said fundamental waves exclusive of other waves to said resulting wave in such phase and amplitude relative to said fundamental components in said resulting wave as to isolate said other components from said fundamental components, and utilizing certain of said other components.

3. The method which comprises modulating a fundamental carrier wave with a fundamental complex signal wave to produce a resulting wave containing fundamental components having the same frequencies as said fundamental waves and other components of frequencies different from those of said fundamental components, balancing said fundamental waves exclusive of other waves against said resulting wave in such phase and amplitude relative to said fundamental components in said resulting wave as to isolate said other components from said fundamental components in said resulting wave, and deriving from said isolated other components said signal wave.

4. The method which comprises modulating a fundamental carrier wave with a fundamental modulating wave to produce a resulting wave containing fundamental components having the frequencies of said fundamental waves and side frequency components, opposing said fundamental waves exclusive of side frequencies to said resulting wave in such phase and amplitude relative to said fundamental components in said resulting wave as to obtain said side frequency components to the exclusion of said fundamental components and said fundamental waves, and transmitting a portion of said side frequency components so obtained to a distant point and there demodulating them to obtain said fundamental modulating wave.

5. The method which comprises demodulating a fundamental modulated signal wave with a fundamental carrier wave to produce a resulting wave containing fundamental components having the frequencies of said fundamental waves and an unmodulated signal component, and opposing said fundamental waves exclusive of unmodulated signal waves to said resulting wave in such phase and amplitude relative to said fundamental components in said resulting wave as to isolate said unmodulated signal component from said fundamental components and said fundamental waves.

6. The method of producing modulation products in a signaling work circuit attached to a modulator to the exclusion of the fundamental waves by whose combination said modulation products are produced, which comprises applying said fundamental waves to the modulator to produce by their combination a resulting wave containing said modulation products and fundamental components having the same frequencies as said fundamental waves, balancing said fundamental waves exclusive of modulation products against said resulting wave in such phase and amplitude relative to said fundamental components in said resulting wave as to isolate said modulation products in said resulting wave from said fundamental components and said fundamental waves, and transmitting a portion of said isolated modulation products to the work circuit to the exclusion of said fundamental components and said fundamental waves.

7. Signaling apparatus comprising a modulator, means for transmitting fundamental waves, including waves to be modulated and modulating waves, to said modulator to be combined in said modulator for producing a resulting wave containing fundamental components having the same frequencies as said fundamental waves and modulation products having frequencies different from said fundamental components, means for opposing said fundamental waves exclusive of modulation products to said resulting wave in such phase and amplitude relative to said fundamental components in said resulting wave as to isolate said modulation products in said resulting wave from said fundamental waves and said fundamental components, and means for utilizing certain of said modulation products.

8. Signaling apparatus comprising a modulator having a single modulating device, said device having an input circuit and an output circuit, means for supplying fundamental waves, including waves to be modulated and modulating waves, to said input circuit to be combined in said device for producing a resulting wave containing fundamental components having the same frequencies as said fundamental waves and modulation products of frequency differing from said fundamental components, a work circuit attached to said output circuit for transmitting signaling waves delivered thereto from said modulator, and means for transmitting said fundamental waves from said input circuit to said output circuit substantially without modulation and in such phase and amplitude relative to said fundamental components in said resulting wave as to isolate said modulation products from said fundamental components and said fundamental waves in said work circuit and thereby cause delivery of a portion of said isolated modulation products from said modulator to said work circuit to the exclusion of said fundamental waves and said fundamental components.

9. The method of modulation which comprises combining fundamental waves, including waves to be modulated and modulating waves, to produce a resulting wave that contains fundamental components of the frequencies of said fundamental waves and modulation products different from said fundamental components, isolating said modulation products from said fundamental components by balancing said fundamental waves exclusive of other waves against said fundamental components in said resulting wave, increasing the output of modulation products by regenerating said modulation products, and utilizing certain of said modulation products.

10. Signaling apparatus comprising a modulator circuit including a modulating device, means for transmitting fundamental waves, including waves to be modulated and modulating waves, to said modulating device to be combined in said modulating device for producing a resulting wave containing fundamental components that have the same frequencies as said fundamental waves and modulation products differing from said fundamental components, means for so opposing said fundamental waves exclusive of other waves to said fundamental components in said resulting wave as to isolate said modulation products, means for regenerating in said modulator circuit, said modulation products only, and means for utilizing certain of said modulation products.

11. Signaling apparatus comprising a modulator having a single modulating device, said device having an input circuit, an output circuit, means for supplying fundamental waves, including waves to be modulated and modulating waves, to said input circuit to be combined in said device for producing a resulting wave containing fundamental components that have the same frequencies as said fundamental waves and modulation products differing from said fundamental components, a work circuit connected across a portion of said output circuit for transmitting signaling waves delivered to said work circuit from said modulator, means for transmitting said fundamental waves exclusive of said modulation products from said input circuit to said portion of said output circuit substantially without distortion and in such phase and amplitude relative to said fundamental components in said resulting wave as to isolate said modulation products from said fundamental components and said fundamental waves across said portion of said output circuit and thereby cause delivery of a portion of said isolated modulation products from said modulator to said work circuit to the exclusion of said fundamental waves and said fundamental components, and means for feeding only said isolated distortion components from said portion of said output circuit to said input circuit, for passing them from said input circuit to said output circuit through said modulating device only once, to amplify them in said device.

12. The method of modulation which comprises combining fundamental waves, including waves to be modulated and modulating waves, to produce a resulting wave that contains fundamental components of the frequencies of said fundamental waves and modulation products different from said fundamental components, isolating said modulation products from said fundamental components by balancing said fundamental waves exclusive of other waves against said fundamental components in said resulting wave, so regenerating said modulation products as to increase them at their place of origin, and utilizing certain of said modulation products.

13. Signaling apparatus comprising a modulator, means for transmitting fundamental waves, including waves to be modulated and modulating waves, to said modulator to be combined in said modulator for producing a resulting wave containing fundamental components that have the same frequencies as said fundamental waves and modulation products differing from said fundamental components, means for so opposing said fundamental waves exclusive of other waves to said fundamental components in said resulting wave as to isolate said modulation products, means for so regenerating said modulating products in said modulator that they reappear at their place of origin in their original phase, and means for utilizing certain of said modulation products.

14. Signaling apparatus comprising a modulator, means for transmitting fundamental waves, including waves to be modulated and modulating waves, to said modulator to be combined in said modulator for producing a resulting wave containing fundamental components that have the same frequencies as said fundamental waves and modulation products differing from said fundamental components, means for so opposing said fundamental waves exclusive of other waves to said fundamental components in said resulting wave as to isolate said modulation products, means for so regenerating said modulation products in said modulator that they reappear at their place of origin with phase reversed and with substantially increased magnitude, and means for utilizing certain of said modulation products.

15. The method of modulation which comprises combining fundamental waves, including waves to be modulated and modulating waves, to produce a resulting wave that contains fundamental components of the frequencies of said fundamental waves and modulation products different from said fundamental components, isolating said modulation products from said fundamental components by balancing said fundamental waves exclusive of other waves against said fundamental components in said resulting wave, amplifying said isolated distortion components in their isolated state, thereafter amplifying them with said fundamental waves, and utilizing certain of said modulation products.

16. A modulator system comprising a modulating device having a grid, a circuit fed from said device, means for transmitting fundamental waves, including waves to be modulated and modulating waves, to said grid to be combined in said modulating device, means for deriving from a portion of said circuit a resulting wave containing fundamental components that have the same frequencies as said fundamental waves and modulation products differing from said fundamental components, means for so opposing said fundamental waves exclusive of other waves to said fundamental components in said derived wave as to isolate said modulation products, means for so feeding said modulation products back to such a portion of said system anterior to said portion of said circuit as to cause the amplitude of said modulation products to be increased by repeated reamplification in a portion of said system anterior to said portion of said circuit but exclusive of said grid, and means for utilizing certain of said modulation products.

17. A duplex wave translating system comprising two wave translating networks connected in push-pull relation, Wheatstone bridges, one connected to the output side of each network, and a load circuit for said system, the bridge connected to the output side of each network having a feed-back diagonal including a non-inductive feed-back connection to the input side of the other network, and having an output diagonal conjugate to its feed-back diagonal and including a connection to said load circuit.

18. A duplex wave amplifying system comprising two wave amplifying paths connected in push-pull relation, Wheatstone bridges, one connected to the output side of each path, a load circuit for said system, a load circuit connection from each of said bridges to said load circuit, and a non-inductive wave transmission circuit from each bridge through one of said amplifying paths to points on the other bridge which are conjugate to the points of the load circuit connection to said other bridge.

19. A duplex modulator system comprising two modulating devices connected in push-pull relation, Wheatstone bridges, one connected to the output side of each device, and a load circuit for said system, the bridge connected to the output side of each device having a feed-back diagonal including a feed-back connection to the input side of the other device, and having an output diagonal conjugate to its feed-back diagonal and including a connection to said load circuit, said feed-back connections being separate from each other.

20. A vacuum tube modulator device having two electrically separate coplanar grids, means for transmitting fundamental waves, including waves to be modulated and modulating waves, to one of said grids to be combined in said device for producing a resulting wave containing fundamental components that have the same frequencies as said fundamental waves and modulation products of frequency different from said fundamental components, means for so opposing said fundamental waves exclusive of other waves to said fundamental components in said resulting wave as to isolate said modulation products, means for feeding said isolated modulation products to said other grid in such phase as to increase their magnitude by repeatedly regenerating them in said device, and means for utilizing certain of said modulation products.

HAROLD S. BLACK.